United States Patent [19]

Grosseholz et al.

[11] Patent Number: 4,924,553
[45] Date of Patent: May 15, 1990

[54] METHOD AND APPARATUS FOR DIVIDING UP UNSKINNED FISH FILLETS

[75] Inventors: Werner Grosseholz, Lübeck; Dirk Schmüser, Sereetz; Werner Wenzel, Lübeck, all of Fed. Rep. of Germany

[73] Assignee: Nordischer Maschinenbau Rud.Baader GmbH & Co. KG, Lübeck, Fed. Rep. of Germany

[21] Appl. No.: 417,708

[22] Filed: Oct. 5, 1989

[30] Foreign Application Priority Data

Oct. 5, 1988 [DE] Fed. Rep. of Germany ....... 3833866
Feb. 4, 1989 [DE] Fed. Rep. of Germany ....... 3903328

[51] Int. Cl.$^5$ .................... A22C 21/04; A22C 25/16
[52] U.S. Cl. ........................... 17/50; 17/52; 17/57; 17/62
[58] Field of Search ............... 17/50, 52, 56, 62, 21, 17/53, 55, 57

[56] References Cited

U.S. PATENT DOCUMENTS

| | | | |
|---|---|---|---|
| 4,236,275 | 12/1980 | Westerdahl | 17/57 |
| 4,354,297 | 10/1982 | Wilson et al. | 17/62 |
| 4,628,570 | 12/1986 | Wenzel | 17/50 |
| 4,748,721 | 6/1988 | Braeger | 17/50 |

*Primary Examiner*—Willis Little
*Attorney, Agent, or Firm*—Thomas R. Morrison

[57] ABSTRACT

A method for dividing up fillets of fish into fillet pieces and an apparatus suitable for performing this method are described. The apparatus comprises a known skinning device, upstream of which is connected a rotating cutting device. This comprises a cutter block, which provides the fillets with incisions extending at least up to the skin. The skinning of the thus prepared fillets by the downstream skinning device brings about the release of the fillet pieces, which, if need be, are held together by the skin.

24 Claims, 2 Drawing Sheets

METHOD AND APPARATUS FOR DIVIDING UP UNSKINNED FISH FILLETS

BACKGROUND OF THE INVENTION

1. Field of the Invention

The invention relates to a method for dividing up unskinned fish fillets into fillet portions or pieces as well as to an apparatus for performing such method.

2. Prior Art

A conventional mechanism for dividing up fish into cross cut pieces is known from German Patent No. 690 357. In said mechanism fish bodies are introduced into a vertically arranged container covered along one side by resilient strips and which is provided with crosswise arranged slots, through which entraining blades are introduced and which grip behind the fish body. As a result the latter is urged by the resilient strips out of the container transversely to its longitudinal axis and is moved against a row of circular knives, whose reciprocal spacings correspond to the desired piece lengths. Such a mechanism does not permit the processing of fillets due to their soft consistency.

The mechanical handling of fillets for producing fillet pieces is made possible through the use of a method according to DE-OS No. 21 46 352. This method consists in cutting a fillet strand formed on a conveying means and comprising fillets arranged in overlapping manner into pieces by cross cuts and in then transferring these from said conveying means into a pack. The machine comprises carrying elements provided with transversal slots and arranged in a row on a conveying mechanism for receiving the fillet strand. The carrying elements are guided to a cutting station comprising a set of circular knives, which are introduced into the transversal slots and then, accompanied by reversal, the carrying elements are pivoted out over a pack and the fillet pieces are placed in it.

This method does not satisfy present day requirements, particularly with regard to the throughput capacity. The lack of variability of the piece length is also disadvantageous.

3. Objects of the Invention

It is the main object of the invention to suggest a possibility for dividing up fish fillets at high efficiency. It is a further object of the invention to enable an integration of a correspondingly designed apparatus into a completely automatically working filletting line. It is yet another object of the invention to provide for an easy adjustment of the piece length to be produced.

SUMMARY OF THE INVENTION

According to the invention these objects are obtained by a method, which is characterized in that the fish fillets are provided with incisions leaving skin at least partly in cohesive form and in that the incised fillets are subsequently skinned. In such method, it is possible to proceed advantageously in such a way that the fillets are cut from the meat side substantially up to the inside of the skin, the reciprocal spacing of the incisions corresponding to the desired fillet piece length, and that the thus prepared fillet pieces are subsequently individualized by skinning.

Specifically for the processing of double fillets, in which the two fillet parts are left cohesive at the backline, the method can be expediently modified in such a way that the incisions run substantially perpendicular to the backline and are made whilst separating the meat and, if desired or required, the skin, only the region close to the backline being left uncut.

For performing the method in general an apparatus is particularly suitable, which includes a known per se skinning device and a cutting device arranged upstream of said skinning device and in connection therewith, which cutting device comprises a pair of superimposed rollers driven to rotate in opposition to each other about parallel axes and reciprocally contacting under a clearly defined pressure, a first roller of the pair being designed as a cutter block, wheel or roller with substantially radially extending knife blades, whose cutting edges are located in a cylindrical circumferential surface, and a second roller of said pair having an elastic surface. By means of such a cutting mechanism it is possible to convert virtually any fish fillet skinning machine into a piece or portion cutter.

For performing the method modified for processing double fillets, it is particularly expedient to use a skinning device combined with a conveyor for conveying the double fillets by conveying engagement in the area directly alongside the backline of the double fillets, upstream of which skinning device is arranged a cutting device in connection therewith, which cutting device comprises at least one driven impact knife each acting on either side of the backline of the double fillet and rotating about a rotation axis, each, which rotation axes are oriented substantially parallel to the conveying plane of the conveyor and are arranged in such a way that the circumferential surfaces of the impact knives in the vicinity of their maximum reciprocal approximation leave a gap extending substantially symmetrically to the backline of the double fillet. A conveyor suitable for this purpose can preferably be associated with the cutting device and comprise a pair of narrow endless belts driven to rotate, which are guided in grooves of a support rail and intrude into incisions made beforehand on either side of the backline of the double fillet. In order to obtain an at least low-slip or skid-free conveying of the double fillet, it is possible to provide a flat belt driven synchronously with and facing said endless belts. To ensure a complete separation of the meat parts on making the piece cuts, there may be provided for an arrangement of the impact knives in such a way that they revolve whilst intruding into the flanks of the support rail which guides and supports the belts. It is easy to adjust the piece length through controlling or regulating the rotational speed of the impact knives.

With a view to controlling the position of the first piece cut (incision) with respect to its distance from the leading end of the fillet, it is preferred to provide a monitoring device for monitoring and recording the particular position of the leading end of the respective fillet, which device generates and emits corresponding control signals. In conjunction with position signals obtained from monitoring the rotary position of the knife blades of the cutter block it is possible to derive therefrom a controlled variable for a time limited change of revolution, whereas in the case of applying impact knives a regulating variable for a time-limited change to the rotation speed of the impact knives is derived from position signals obtained by the rotary-position-monitoring and from the particular position signal of the double fillet to be processed, so as to bring about time coincidence between the arrival of the leading fillet end and the action time of the knife blade.

Particularly important economic advantages may be obtained if the apparatus together with its conveyor is positioned at the discharge area of a filleting machine. The advantage thereof is that the fillets can be supplied to the apparatus according to the invention in an oriented or aligned state, i.e. without the requirement of any additional orientation or alignment, and accompanied by automatic adaptation of the throughput capacity to that of the filleting machine.

BRIEF DESCRIPTION OF THE DRAWINGS

Other and further objects of the present invention will be apparent from the following description and claims and are illustrated in the accompanying drawings which by way of illustration schematically show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims. In the drawings FIG. 1 a simplified representation of a piece cutting skinning device in an axonometric view;

DETAILED DESCRIPTION OF THE PREFERRED EMBODIMENTS

Figures 1, 2:
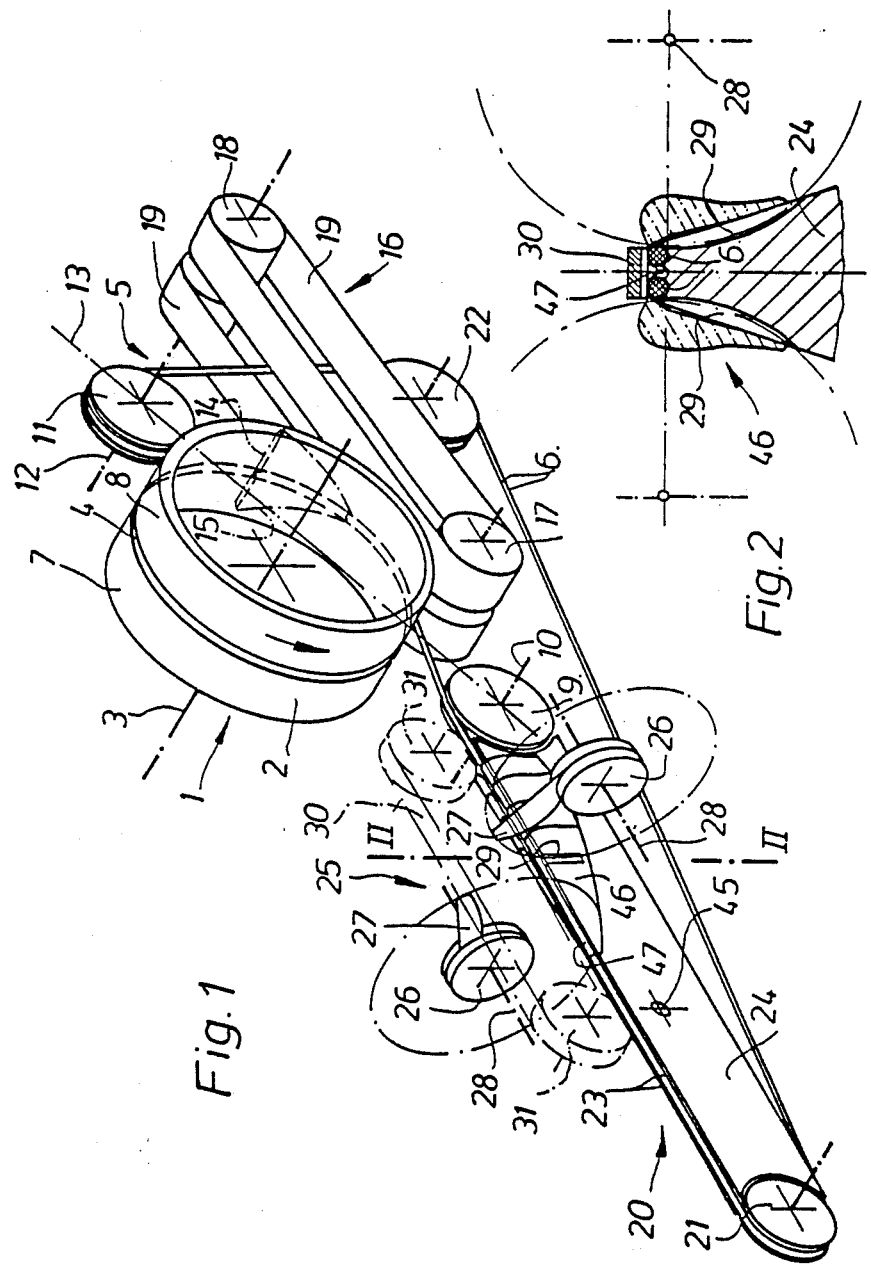
FIG. 2 a cross-section in the region of the cutting device shown in FIG. 1 along section line II—II.

According to FIG. 1, a per se known skinning device completed according to the invention is provided with a drum 1 rotated in an appropriate manner in accordance with the rotation direction arrow about a horizontal axis 3 and arranged in a not shown frame. The drum 1 has a circumferential surface 2, which is centrally split into two circumferential surfaces 7,8 by a track groove 4 for receiving an endless belt 5, constituted by two round-section belt members 6. The circumferential surfaces 7 and 8 can be designed so as to give them a good grip. Each of the two round-section belt members 6 is guided by double grooved pulleys 9 and 11 arranged upstream and downstream of the drum 1, respectively, which can be arranged in such a way that the connecting line 13 of their axes 10 and 12, respectively, is secant with respect to the circumferential circle of the drum 1. Thus, the round-section belt members 6 loop round the drum 1 on a downwardly directed part of the circumference thereof, the belt members 6 being guided in the track groove 4 with their outside facing the bottom of the latter. In the region of the looping a skinning tool 14 is arranged in fixed manner and at a small distance above the circumferential surface 2 of the drum 1. The tool 14 has a pair of cutting edges 15 passing in plough-like manner to one another and which are shaped so as to closely engage with the circumferential surface 2. The skinning tool 14 is covered by a pressing means 16 comprising two transversely elastic, flexible flat belts 19 divided in the region of the track groove 4, which are deflected and guided in the region of deflection rollers 17, 18 in such a way that they engage on the drum 1 at least in the region of the skinning tool 14.

The two round-section belt members 6 are endlessly guided by deflection over two further grooved pulleys 21, 22 and form a conveyor 20 for the double fillets. The grooved pulley 21 is positioned upstream of the grooved pulley 9 and is arranged in such a way that the upper run 23 of the belt members 6 extending between the same runs substantially horizontally, whereby the belt members are guided in supporting manner in grooves of a support rail 24 having a slightly roof-shaped cross-section.

According to FIG. 1 there is installed a cutting device 25 in the area between the two V-grooved pulleys 9 and 21, which cutting device comprises a pair of impact knives 26 arranged on either side of the support rail 24. Each of the impact knives 26 is formed by a knife blade 27, which is mounted to rotate about a rotation axis 28, each. These axes extend parallel to the upper strand 23 of the conveyor 20 and in a horizontal plane with the latter. The impact knives 26 are driven in an appropriate manner such that the speed thereof may be adjusted. The position of the rotation axes 28 of the impact knives 26 is chosen such that the knife blades 27 intrude into the flanks of the support rail 24. For this purpose corresponding insertion or intrusion pockets 29 are provided in the flanks. The upper strand 23 of conveyor 20 is opposed by an endless flat belt 30, which, for the sake of clarity, has been shown in dash-dotted lines and which is driven to rotate about two deflection pulleys 31 synchronously with the conveyor 20 and is kept elastically pressed against said upper strand 23 in an appropriate manner. For reasons of good gripping, i.e. sufficient skid resistance, the flat belt 30 is e.g. designed as a toothed belt and has a width which just leaves free its lower strand between the rotary planes of the knife blades 27 (cf. FIG. 2).

Figure 3:
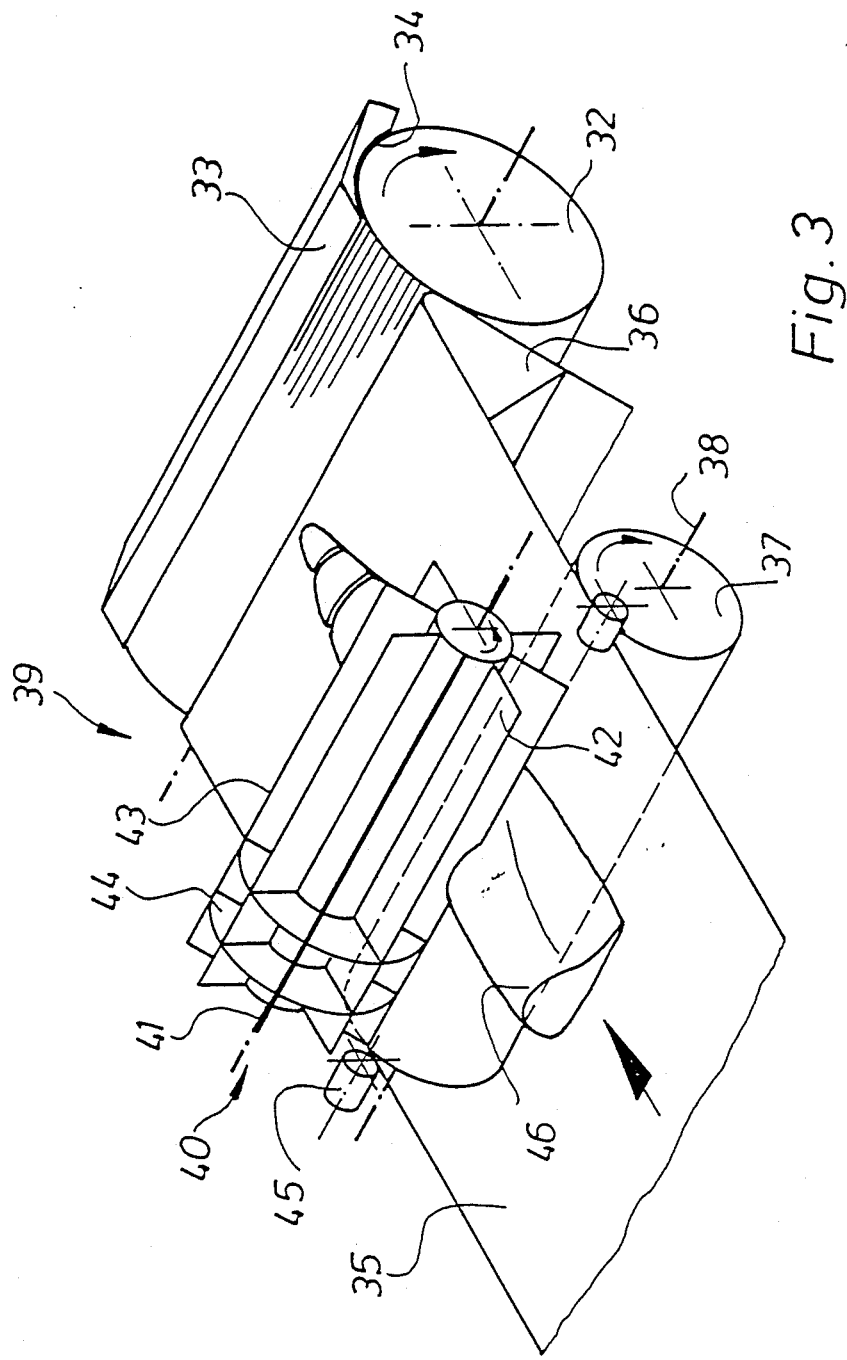
FIG. 3 a modified embodiment variant of the piece cutting device in connection with a skinning device of another construction, also in axonometric view.

The apparatus according to FIG. 3 comprises a modified cutting device and is also based on a prior art skinning device, which comprises a skinning roller 32 having a circumferential surface provided with longitudinal grooves to obtain good gripping properties, a skinning knife 33 facing the roller 32 at a limited spacing and whose surface facing said roller's circumferential surface is constructed as a pressing surface 34, and a conveying means with an endless conveyor belt 35 which, directly upstream of the circumferential surface of the skinning roller 32, is deflected by a guide wedge 36 into the returning strand. The skinning roller 32 and the conveyor belt 35 are rotated in the same direction in an appropriate manner. The working strand of the conveyor belt 35 is supported by a back-up roller 37 upstream of the reversal point formed by the guide wedge 36. The axis 38 of the back-up roller 37 extends parallel to that of the skinning roller 32 and can be provided with an elastic covering. Expediently, the back-up roller 37 is driven as well, its circumferential speed being in accordance with the speed of advance of the conveyor belt 35. The back-up roller 37 is opposed by a cutter block or roller 40 having the conveyor belt 35 therebetween them. The cutter block 40 is driven to rotate about an axis 41 parallel to the axis 38 synchronously and in opposite direction to the back-up roller 37 and is held resiliently pressed against the latter. The cutter block 40 is provided with knife blades 41, which are oriented substantially radially, extend in axially parallel manner and are arranged at equal pitch. Thus the cutting edges 42 of the blades 41 are located in an envelope surface concentric to the axis 38 and, they may be interrupted by radial circular cutting edges 44.

The function of the apparatus according to the invention will be described hereinafter whilst following a fillet 46, which has been placed on the respective conveying means with the skin directed downwards:

Considering first the apparatus of FIG. 1, the fillet 46, which, in this example, is in the form of a double fillet cut from the meat side on either side and along the backline up to the skin, passes into the draw-in area between the conveyor 20 and the flat belt 30. It is securely fixed in this way and supplied to the cutting device 25. The two fillet parts hanging down from the flanks of the support rail 24 pass into the action area of the impact knives 26, which make incisions in the double fillets as these pass by continuously. The intruding of the knife blades 27 into the insertion pockets 29 in the flanks of the support rail 24 also brings about a severing of the skin. Thus, the skinning device is supplied with a double fillet, whose fillet parts are provided with incisions up to the region of the backline, the spacing of the incisions being derived from the speed of the impact knives 26 relative to the speed of advance of the double fillet. The double fillet initially passes into the region of the run-up point of the round-section belt members 6 onto the drum 1. After the passage thereof the skin is jammed between the bottom of the flange groove 4 of drum 1 and belt members 6 and is therefore reliably secured. At the same time the flat belts 19 have closely engaged the fillet parts on either side of the backline with the circumferential surfaces 7, 8 of drum 1, so that the double fillet reaches the skinning tool 14 whilst being supported by the flat belts 14, whose edges 15, starting at the separating cuts along the backline, split away the skin from the fillet parts in the outward direction. As these parts rest in pieces on the skin due to the preparation in the cutting device 25, the fillets are obtained as skinned fillet pieces.

In the case of the apparatus according to FIG. 3 the fillet is supplied to the cutting device 39 resting on the conveyor belt 35, so that the knife blades 42 of the cutter block 40 penetrate the fillet meat. This is divided up to the skin. Due to the elasticity of the conveyor belt 35 or the circumferential surface of the back-up roller 37, respectively, the skin remains undamaged, so that skinning takes place in the conventional way, but skinned fillet pieces are produced, which can also assume a cubic shape if the cutter block 40 is also provided with the radial or annular cutting edges 44.

By using different cutter blocks 40, the piece length can be varied in said apparatus and for the said purpose the blocks 40 can be fitted in an easily replaceable manner and differ from one another by a different spacing of the knife blades 42. In the case of the apparatus according to FIG. 1 the piece length can be adjusted by regulating the speed of the impact knives 26.

In order to be able to produce the first piece cut in a piece length corresponding to the piece lengths obtained by the following cuts, it is possible to provide a control device, which e.g. comprises a light barrier 45 for recording the leading end of the fillet 46 and a timing generator coupled to the respective conveyor, and provides the driving of the cutter block 40 or the impact knives 26, respectively, by means of a not-shown stepping motor. The corresponding signal from the light barrier 45 can then be related to a reference signal emitted during each revolution by the stepping motor and synchronized with the rotary position of the knife blades 42 or 27 of the cutter block 40 or the impact knives 26, respectively. From this can be derived a controlled variable for a time-limited change to the rotational speed, in order to obtain time coincidence between the arrival of the leading end of the fillet 46 and the action time of a knife blade 42 or 27, respectively.

What is claimed is:

1. A method for dividing up fish fillets, with skin still adhering to the fillets on one side thereof, into fillet pieces, the method comprising the steps of
    (a) providing the unskinned fish fillets with incisions whilst leaving the skin at least partly in cohesive form, and
    (b) subsequently skinning the thus incised fillets.

2. A method as claimed in claim 1, comprising the steps of
    (a) cutting the fillets from the meat side opposing said skin substantially up to the inside of said skin by a plurality of incisions spaced with regard to each other, this reciprocal spacing of said incisions being adjusted to correspond to the desired length of said fillet pieces to be produced, and
    (b) subsequently individualizing the thus prepared fillet piece by skinning.

3. A method as claimed in claim 1 for processing double fillets of fish, which double fillets include two fillet parts left cohesive at the backline of the fish, said method comprising the steps of making said incisions to run substantially perpendicular to said backline and to a depth to separate the meat and, if desired, the skin, whilst leaving only the area in the close vicinity of said backline uncut.

4. A method as claimed in claim 2 for processing double filets of fish, which double filets include two filet parts left cohesive at the backline of the fish, said method comprising the steps of making said incisions to run substantially perpendicular to said backline and to a depth to separate the meat and, if desired, the skin, whilst leaving only the area in the close vicinity of said backline uncut.

5. An apparatus for dividing up fish fillets, with skin still adhering to the fillets on one side thereof, into fillet pieces, said apparatus comprising
    (a) cutting means for providing the unskinned fish fillets with incisions whilst leaving the skin at least partly in cohesive form, which cutting means include a pair of superimposed rollers driven to rotate in opposition to each other about parallel axes and reciprocally contacting under a clearly defined pressure, a first roller of said pair of rollers being designed as a cutter block having substantially radially extending knife blades, whose cutting edges are located in an imaginary common cylindrical circumferential surface, and a second roller of said pair having an elastic surface, and
    (b) skinning means for subsequently skinning the incised fillets, said skinning means being arranged downstream of said cutting means and in operational connection therewith.

6. An apparatus as claimed in claim 5 wherein monitoring means for monitoring and recording the position of the leading end of the particular fillet to be processed are provided.

7. An apparatus for dividing up fish fillets, with skin still adhering to the fillets on one side thereof, into fillet pieces, said apparatus comprising
    (a) cutting means for providing the unskinned fish fillets with a plurality of incisions spaced with regard to each other and performed from the meat side opposing said skin substantially up to the inside of said skin whilst leaving the skin at least partly in cohesive form, the reciprocal spacing of said incisions corresponding to the desired length of said fillet pieces to be produced, which cutting means include a pair of superimposed rollers driven to rotate in opposition to each other about parallel axes and reciprocally contacting under a clearly defined pressure, a first roller of said pair of rollers being designed as a cutter block with substantially radially extending knife blades, whose cutting edges are located in a cylindrical circumferential surface, and a second roller of said pair having an elastic surface, and (b) skinning means for subsequently individualizing said prepared fillet pieces by skinning the incised fillets, said skinning means being arranged downstream of said cutting means and in operational connection therewith.

8. An apparatus as claimed in claim 7, wherein monitoring means for monitoring and recording the position of the leading end of the particular filet to be processed are provided.

9. An apparatus for processing double fillets of fish, which double fillets include two fillet parts left cohesive at the backline of the fish, and with the skin still adhering to the fillets on one side thereof, by dividing up said fillet parts into fillet pieces, said apparatus comprising (a) cutting means for providing the unskinned fish fillets with incisions running substantially perpendicular to said backline and to a depth to separate said fillet parts and, if desired, the skin, said cutting means including at least one driven impact knife acting on either side of said backline and each defining a knife blade and arranged to rotate about a rotation axis, (b) conveyor means defining a conveyor plane and arranged to convey said double fillets through said cutting device by conveying engagement in the area directly alongside said backline, said conveyor means and said cutting means being associated with each other such that said rotation axes are oriented substantially parallel to said conveyor plane and arranged in such a way that the circumferential surfaces of said impact knives in the vicinity of their maximum reciprocal approximation leave a gap extending substantially symmetrically t said backline of said double fillet, thus leaving only the area close to said backline uncut, and (c) skinning means for subsequently skinning the incised fillets, said skinning means being arranged downstream of said cutting means and in operational connection therewith through said conveyor means.

10. An apparatus as claimed in claim 9, wherein said conveyor means comprise a pair of narrow endless belt means driven to rotate, and said apparatus further comprising support rail means including groove means, said belt means being guided in said groove means and intruding into incisions made beforehand on either side of said backline of said double fillet.

11. An apparatus as claimed in claim 9 wherein a synchronously driven flat belt facing said conveyor means is provided at least in the region of said cutting device.

12. An apparatus as claimed in claim 10 wherein a synchronously driven flat belt facing said pair of endless belt means is provided at least in the region of said cutting device.

13. An apparatus as claimed in claim 10 wherein pockets are arranged in flanks provided in said support rail means, said impact knives intruding into said pockets during revolution.

14. An apparatus as claimed in claim 9 wherein control means are provided to control said impact knives with regard to their rotational speed.

15. An apparatus as claimed in claim 9 wherein monitoring means for monitoring and recording the position of the leading end of the particular fillet to be processed are provided.

16. An apparatus as claimed in claim 9 wherein monitoring means are provided to monitor the rotary position of said knife blades of said impact knives and to derive a regulating variable for a time-limited change to the rotational speed of said impact knives from position signals based on the rotary-position-monitoring and from a particular position signal of the double fillet to be processed, so as to bring about time coincidence between the arrival of the leading fillet end and the action time of said knife blades.

17. An apparatus for processing double fillets of fish, which double fillets include two fillet parts left cohesive at the backline of the fish, and with the skin still adhering to the fillets on one side thereof, by dividing up said fillet parts into fillet pieces, said apparatus comprising (a) cutting means for providing the unskinned fish fillets with a plurality of incisions spaced with regard to each other, this reciprocal spacing corresponding to the desired length of the fillet pieces being produced, and running substantially perpendicular to said backline and to a depth to separate said fillet parts and, if desired, the skin, said cutting means including at least one driven impact knife acting on either side of said backline and each defining a knife blade and arranged to rotate about a rotation axis, (b) conveyor means defining a conveyor plane arranged to convey said double fillets through said cutting device by conveying engagement in the area directly alongside said backline, said conveyor means and said cutting means being associated with each other such that said rotation axes are oriented substantially parallel to said conveyor plane and arranged in such a way that the circumferential surfaces of said impact knives in the vicinity of their maximum reciprocal approximation leave a gap extending substantially symmetrically to said backline of said double fillet, thus leaving only the area close to said backline uncut, and (c) skinning means for subsequently skinning the incised fillets, said skinning means being arranged downstream of said cutting means and in operational connection therewith through said conveyor means.

18. An apparatus as claimed in claim 17, wherein said conveyor means comprise a pair of narrow endless belt means driven to rotate, and said apparatus further comprising support rail means including groove means, said belt means being guided in said groove means and intruding into incisions made beforehand on either side of said backline of said double fillet.

19. An apparatus as claimed in claim 18, wherein a synchronously driven flat belt facing said pair of endless belt means is provided at least in the region of said cutting device.

20. An apparatus as claimed in claim 18, wherein pockets are arranged in flanks provided in said support rail means, said impact knives intruding into said pockets during revolution.

21. An apparatus as claimed in claim 17, wherein a synchronously driven flat belt facing said conveyor means is provided at least in the region of said cutting device.

22. An apparatus as claimed in claim 17, wherein control means are provided to control said impact knives with regard to their rotational speed.

23. An apparatus as claimed in claim 17, wherein monitoring means for monitoring and recording the position of the leading end of the particular filet to be processed are provided.

24. An apparatus as claimed in claim 17, wherein monitoring means are provided to monitor the rotary position of said knife blades of said impact knives and to derive a regulating variable for a time-limited change to the rotational speed of said impact knives from position signals based on the rotary-position monitoring and from a particular position signal of the double filet to be processed, so as to bring about time coincidence between the arrival of the leading filet end and the action time of said knife blades.

* * * * *